(12) United States Patent
Schneider et al.

(10) Patent No.: US 8,507,063 B2
(45) Date of Patent: Aug. 13, 2013

(54) PET CONTAINERS WITH ENHANCED THERMAL PROPERTIES

(75) Inventors: Mark D. Schneider, St. Charles, IL (US); Kerry W. Silvers, Campbellsburg, IN (US)

(73) Assignee: Graham Packaging LC, L.P., York, PA (US)

( * ) Notice: Subject to any disclaimer, the term of this patent is extended or adjusted under 35 U.S.C. 154(b) by 846 days.

(21) Appl. No.: 12/564,845

(22) Filed: Sep. 22, 2009

(65) Prior Publication Data

US 2011/0070388 A1 Mar. 24, 2011

(51) Int. Cl.
*B32B 1/02* (2006.01)
*B32B 1/08* (2006.01)

(52) U.S. Cl.
USPC ..... 428/36.92; 428/34.1; 428/34.2; 428/35.7; 428/35.9; 428/36.9

(58) Field of Classification Search
USPC ............... 428/34.1, 34.2, 35.7, 35.9, 36.9, 428/36.92
See application file for complete search history.

(56) References Cited

U.S. PATENT DOCUMENTS

| | | | |
|---|---|---|---|
| 4,233,022 A | 11/1980 | Brady et al. | |
| 4,476,170 A | 10/1984 | Jabarin | |
| 4,512,948 A | 4/1985 | Jabarin | |
| 4,522,779 A | 6/1985 | Jabarin | |
| 4,535,025 A | 8/1985 | Jabarin | |
| 4,603,066 A | 7/1986 | Jabarin | |
| 4,713,270 A | 12/1987 | Jabarin et al. | |
| 4,839,127 A | 6/1989 | Ajmera et al. | |
| 4,891,178 A | 1/1990 | Ajmera et al. | |
| 5,501,590 A | 3/1996 | Orimoto et al. | |
| 5,562,960 A | 10/1996 | Sugiura et al. | |
| 6,464,683 B1 | 10/2002 | Samuelson et al. | |
| 6,485,669 B1 | 11/2002 | Boyd et al. | |
| 6,485,670 B1 | 11/2002 | Boyd et al. | |
| 6,514,451 B1 | 2/2003 | Boyd et al. | |
| 6,749,415 B2 | 6/2004 | Boyd et al. | |
| 6,767,197 B2 | 7/2004 | Boyd et al. | |
| 6,841,117 B1 | 1/2005 | Smith et al. | |
| 7,033,656 B2 | 4/2006 | Nahill et al. | |
| 2001/0017429 A1* | 8/2001 | Takahashi et al. | 264/141 |
| 2003/0186006 A1* | 10/2003 | Schmidt et al. | 428/35.7 |

(Continued)

FOREIGN PATENT DOCUMENTS

| | | |
|---|---|---|
| JP | 62-71622 | 4/1987 |
| WO | 01/96448 | 12/2001 |
| WO | 2008/016114 | 2/2008 |

OTHER PUBLICATIONS

"Vitrification and devitrification of the rigid amorphous fraction in poly(ethylene terephthalate)" Maria Cristina Righetti and Maria Laura Di Lorenzo, e-polymers May 2009, No. 053, http://www.e-polymers.org (http://www.e-polymers.org/journal/papers/mcrighetti_310509.pdf) ISSN 1618-7229.

(Continued)

*Primary Examiner* — Marc Patterson
(74) *Attorney, Agent, or Firm* — Stradley Ronon Stevens & Young, LLP

(57) ABSTRACT

The present invention provides a blow molded heat set PET container having enhanced thermal properties and a first glass transition temperature and a second endothermic transition temperature substantially higher than the glass transition temperature.

10 Claims, 15 Drawing Sheets

(56) References Cited

U.S. PATENT DOCUMENTS

| | | |
|---|---|---|
| 2005/0140036 A1 | 6/2005 | Hirota et al. |
| 2006/0293421 A1 | 12/2006 | Reitz et al. |
| 2007/0047080 A1 | 3/2007 | Stover et al. |
| 2007/0065615 A1 | 3/2007 | Odle et al. |
| 2007/0244550 A1 | 10/2007 | Eidenschink |
| 2011/0204067 A1 | 8/2011 | Schneider et al. |

OTHER PUBLICATIONS

Timothy J. Boyd, A Dissertation entitled "Transient Crystallization of Poly (ethylene terephthalate) Bottles", The University of Toledo Aug. 2004.

International Search Report and Written Opinion for international patent application No. PCT/US2010/048862 dated Dec. 20, 2010.

* cited by examiner

DSC

PET CONTAINERS WITH ENHANCED THERMAL PROPERTIES

BACKGROUND OF THE INVENTION

1. Technical Field

This invention relates to PET containers having enhanced thermal properties and methods for making the same.

2. Background Art

Blow molding processes for forming PET containers are well known in the art. Blown PET containers have replaced metal and glass containers in numerous food storage applications such as carbonated soft drinks and lower temperature filled food products such as peanut butter and mayonnaise. However, prior art PET containers have not replaced metal and glass containers for product storage and processing applications where the container is filled or heated to temperatures above 97° C. (207° F.) as such containers experience significant shrinkage, deformation rendering the container unuseable. Additional in-roads into the replacement of glass is desired in food processing applications such as low-temperature pasteurization, high-temperature pasteurization and retort. Low temperature pasteurization include the pasteurization of liquid products such as beer and tea. High temperature pasteurization processes are for solid food products such as pickles that have slower heat transfer and require temperatures in excess of 100° C. Retort processes are for pasteurizing low acid products and require temperatures from 100° C. to 130° C. and pressures sufficient to maintain water in a liquid state.

Prior art efforts to increase the thermal performance of PET containers have focused on increasing the crystallinity levels of PET. PET is a crystallizable polymer meaning that its crystallinity can be manipulated by the process of forming articles from the PET. These efforts have been successful to the extent of forming PET containers capable of withstanding temperatures up to 97° C. (207° F.) but not much beyond.

A two-phase model of PET states that PET molecules can exist in two morphologies: an amorphous phase and a crystalline phase. The amorphous phase has been described on a molecular level as resembling a bowl of spaghetti. In a solid state the molecular motion is restricted to very short range vibrations and rotations but in the molten state there is considerable segmental motion arising from rotation about chemical bonds.

In the crystalline phase the polymer chains arrange themselves in thermodynamically favorable alignment. Crystalline portions of the PET molecules can extend straight in one direction and then fold back and forth numerous times to form a folded structure. Numerous such folded structures can stack to form more complex structures known as lammelae. Parallel chains in the crystalline phase can be connected with reentry folds of amorphous portions of the molecule in what is known as a switchback model.

A three phase model of PET has also been proposed to account for deficiencies observed in the two-phase model. The three-phase model includes a crystalline phase, a rigid amorphous phase and a mobile amorphous phase. One article describing the three-phase model is "Vitrification and devitrification of the rigid amorphous fraction in polyethylene terephthalate)" by Maria Cristina Righetti and Maria Laura Di Lorenzo published at e-polymers.org in 2009, the disclosure of which is incorporated herein in its entirety and made a part hereof.

Three commonly known methods for increasing the crystalline fraction of PET includes quiescent crystallization, strained induced crystallization and a combinations of the two. Quiescent crystallization requires exposing an amorphous PET article to heat above the glass transition temperature of PET (70° C. or 158° F.) to impart mobility into the polymer chains to allow them to reorganize into the crystalline morphology. Strain induced crystallization requires stretching of the PET under proper heat and extension ratios to orient the PET molecules into a crystalline morphology. An example of strain induced crystallization is when a preform (a test tube shaped article) is blown into a mold of greater volume to cause stretching of the preform in a single direction or in multiple directions to cause strain-induced crystallization in the expanded article. Articles with strain induced crystallinity can be exposed to heat in a process known as heat setting or thermal annealing to cause a relaxation in the stressed induced crystallinity to increase the thermal properties of the final article. The prior art discloses that the orientation of the polymer chains creates a condition where crystal formation is kinetically favorable upon application of thermal energy.

PET blow mold systems can be an integrated system or a non-integrated system. An integrated system includes an injection molding station for forming the preform in-line with the blow mold station. The preform coming from the injection mold does not have to be reheated and may have to be cooled to the desired orientation system. In a non-integrated system, the preform in injection molded, cooled and then fed into the blow mold station or stations where it is reheated to the desired orientation temperature and then conveyed to the blow mold station or stations.

U.S. Pat. Nos. 4,476,170; 4,512,948; 4,522,779; 4,535,025; 4,603,066; 4,713,270; 4,839,127 and 4,891,178 disclose single mold systems for forming PET containers. As these patents name Jabarin as an inventor they shall sometimes be referred to as the Jabarin patents. Those patents disclose using mold temperatures up to 250° C. (482° F.) to form containers having crystallinities of up to 60%. Removing the finished containers from such molds without shrinkage of the containers requires either lowering the temperature of the mold to a point where the containers are self-sustaining and can be removed or applying internal pressure to the container when removing the container until the container cools to a temperature where the container is self-sustaining. As explained by Dr. Timothy J. Boyd in his dissertation "Transient Crystallisation of Poly (Ethylene Terephthalate) Bottles" ("Boyd Dissertaion") neither of these techniques were commercially feasible as the first technique would require extremely long cycle times and the second would be difficult to control in commercial applications.

U.S. Pat. Nos. 5,562,960 and 5,501,590 disclose two mold systems for forming PET containers known as a dual-blow system. Those patents require forming an intermediate article in a first mold having a volume greater than the finished container, conveying the intermediate article through a shrink oven to crystallize the intermediate article and then placing the intermediate article into a second mold where it is blown into the finished article. Containers formed from this method have reported crystallinities from 40-50%.

U.S. Pat. Nos. 6,485,669; 6,485,670; 6,514,451; 6,749,415 and 6,767,197 ("Boyd et al. patents") and the Boyd Dissertation disclose that the minimum amount of cooling during the blow molding process and the higher the temperature at de-molding leads to the higher thermal properties of the finished article. The Boyd et al. patents disclose blowing heated air, hot air annealing, or a combination of heated air and fluid onto the inner surface of an article in a blow mold to increase the thermal properties of the finished article.

Commercial techniques for forming PET utilize both threaded and unthreaded preforms. Preforms are essentially amorphous having less than about 5% crystallinity. Upon blow molding a threaded preform into an expanded article the threads will have substantially the same dimension in the finished article as the preform, and, therefore, will have little if any strain induced crystallization. Such a finish will be susceptible to softening and deformation under hot fill conditions. Thus, some amount of crystallization must be imparted to the finish section to enhance thermal performance without shrinking the finish and without imparting whitening to the finish. U.S. Pat. No. 7,033,656 discloses a method for crystallizing the finish section in such a way that one surface is crystallized throughout its length and the other surface includes an area that is essentially uncrystallized with a crystallization in a mid-portion of the finish being graded between the surfaces.

U.S. Pat. No. 4,233,022 discloses an apparatus for forming a PET container from a threaded preform. The '022 patent states that due to the low orientation of the finish and the heel of the container during blow molding that it is undesirable to heat set these areas as it would create whitening in these areas by creating sperulitic crystallinity. Thus, the '022 patent discloses a blow station that selectively heats the strain-oriented sections of the container and cooling the portions of the container having little or no strain orientation.

U.S. Pat. No. 6,841,117 discloses a method for blow molding a container from an unthreaded preform. The method includes the step of blow molding a preheated, threadless preform in a heated mold having threads of the desired size to form an intermediate container having threads. The intermediate container has a moil section above the threaded finish which is cut from the intermediate container to form the final container. The finish will have a desired crystallinity of 25% to provide sufficient thermal properties for hot fill applications. More particularly, the preform is preheated to a temperature of 108° C. and then disposed within a mold cavity maintained at temperatures from 138-143° C. The portion of the mold cavity forming the bottom of the container is maintained at 49-54° C. After the mold is closed the preform is blown with air pressure of 40 bar for 1.5 to 3 seconds.

A stretch cooling rod blows recirculating cooling gas at a temperature from 20-40° C. inside the container in the region of the blown threads. The container is removed from the mold at below about 80° C.

These and other aspects and attributes of the present invention will be discussed with reference to the following drawings and accompanying specification.

SUMMARY OF THE INVENTION

The present invention provides a blow molded heat set PET container having enhanced thermal properties and a first glass transition temperature and a second endothermic transition temperature substantially higher than the first glass transition temperature.

The present invention further provides a blow molded heat set PET container having enhanced thermal properties and a first glass transition temperature wherein the change in heat capacity at the glass transition temperature is less than about 0.10 J/g° C.

The present invention further provides a blow molded heat set PET container having enhanced thermal properties wherein the X-ray diffraction pattern has at least five crystalline peaks.

The present invention further provides a blow molded heat set PET container having enhanced thermal properties having a crystallinity less than about 30% and a density of greater than about 1.37 g/cc.

The present invention further provides a process for forming a heat set PET container with enhanced thermal stability including: (1) inserting a preform into a blow mold; (2) blowing the preform into a container having an inner surface and an outer surface and a sidewall having variations in wall thickness along an axial dimension with thinner wall portions and thicker wall portions; (3) selectively cooling predetermined portions of the inner surface by directing a flow of cooling fluid with the thicker wall portions receiving more cooling fluid than the thinner wall portions; and (4) removing the container from the blow mold when the container has sufficiently cooled to be self-supporting and further cooling the container outside the mold.

The present invention further provides a process for forming a heat set PET container with enhanced thermal stability including: (1) inserting a preform into a blow mold; (2) blowing the preform into a container having an inner surface and an outer surface and a sidewall having variations in wall thickness along an axial dimension with thinner wall portions and thicker wall portions and maintaining the blown bottle in the mold at a temperature within the range of 160-200° C. for a period from two to twenty seconds; (3) selectively cooling predetermined portions of the inner surface by directing a flow of cooling fluid with the thicker wall portions receiving more cooling fluid than the thinner wall portions; and (4) removing the container from the blow mold when the container has sufficiently cooled to be self-supporting and further cooling the container outside the mold.

The present invention further provides a process for forming a heat set PET container with enhanced thermal stability including: (1) inserting a preform into a heated blow mold; (2) blowing the preform into a container having a sidewall with an inner surface and an outer surface, the sidewall having variations in wall thickness along an axial dimension with thinner wall portions and thicker wall portions; (3) maintaining thinner wall portions at a first temperature and thicker wall portions at a second temperature lower than the first temperature and selectively cooling predetermined portions of the inner surface by directing a flow of cooling fluid with the thicker wall portions receiving more cooling fluid than the thinner wall portions; and (4) removing the container from the blow mold when the container has sufficiently cooled to be self-supporting and further cooling the container outside the mold.

The present invention further provides a process for forming a heat set PET container with enhanced thermal stability including: (1) inserting a preform into a heated blow mold; (2) blowing the preform into a container having a sidewall with an inner surface and an outer surface, the sidewall having variations in wall thickness along an axial dimension with thinner wall portions and thicker wall portions and maintaining the blown bottle in the mold at a temperature within the range of 160-200° C. for a period from two to twenty seconds; (3) maintaining thinner wall portions at a first temperature and thicker wall portions at a second temperature lower than the first temperatures and selectively cooling predetermined portions of the inner surface by directing a flow of cooling fluid with the thicker wall portions receiving more cooling fluid than the thinner wall portions; and (4) removing the container from the blow mold when the container has sufficiently cooled to be self-supporting and further cooling the container outside the mold.

DETAILED DESCRIPTION OF THE INVENTION

Figure 1:
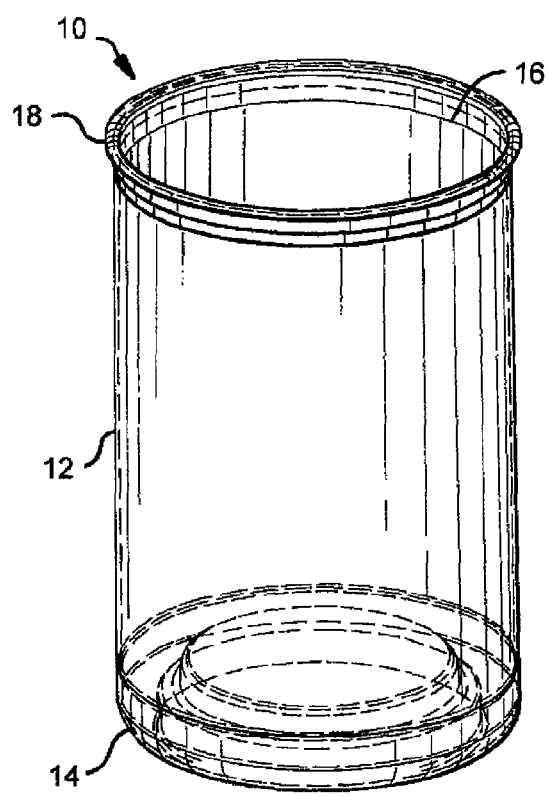
FIG. 1 is a perspective view of a jar type container.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

The present invention provides a container of a crystallizable polymer having enhanced thermal properties while still providing a container with high clarity. Suitable crystallizable polymers include, for example, homopolymers of poly (ethylene terephthalate) and phthalic based copolymers ("PET"). In a preferred form of the invention, the containers will be fabricated from PET resin having an intrinsic viscosity from 0.72 to about 0.86. Suitable PET resins include bottle grade PET resins including PARASTAR resins sold by the Eastman Chemical Company, PET resins sold by Wellman, Inc. and CLEAR TUF resins sold by M&G Polymers. The crystallizable polymer containers of the present invention can have any geometry, shape or size without departing from the present invention and include containers that are round, oval, polygonal, and irregular. Suitable containers can be a jar-type, can-type, carafe, wide mouth and any other type container known to those of ordinary skill in the art. Suitable features of the containers can include pressure absorbing features, grip enhancing features, shoulders, bumpers, finishes, chimes, standing rings, necks and others know to those of ordinary skill in the art.

Figure 2:
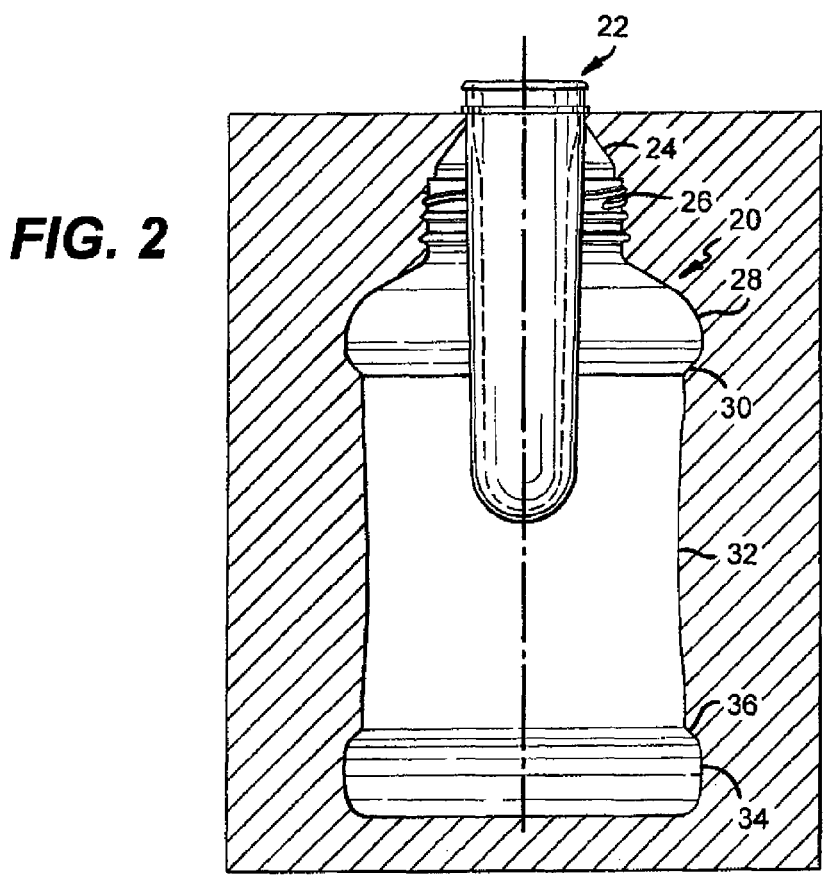
FIG. 2 is a side elevation view showing a preform overlaid onto a mold cavity for a jar-type container.

FIG. 1 shows one container of the present invention in the form of a can 10, having a generally cylindrical side wall 12, a bottom 14, an open top 16 circumscribed by a flange section 18. FIG. 2 shows mold cavity 20 and a preform 22 for forming a jar-type container having a conical top section 24, a finish section 26, a shoulder section 28, a first bumper section 30, a sidewall or barrel section 32, a bottom section 34 and a second bumper section 36.

In a preferred form of the invention, the containers will be formed on an integrated platform with a blow mold station. What is meant by an integrated platform is that the preform 22 is formed in line with the blow mold cavities. Thus, the preform does not have to be reheated to a preferred orientation temperature as is required of non-integrated platforms. Further, in non-integrated platforms, preforms may increase in moisture content over time which is undesirable. Accordingly, the preform of an integrated system will have a single heat history unlike a preform that is formed, cooled and then reheated to the desired orientation temperature and, therefore, has multiple heat histories. In a preferred form of the invention, a preform will have a moisture content of less than about 30 ppm.

In a preferred form of the invention of FIG. 2, the single-heat history preform 22 will be disposed within a blow mold cavity 20 of a single blow station having a temperature higher than the glass transition temperature ("Tg"), and more preferably within the range of 73° C. to 250° C., more preferably 150° C.-240° C., more preferably 160° C.-230° C. and most preferably from 160° C.-200° C. and any range or combination of ranges therein. For a single blow mold station, the container will remain in the mold from about two seconds to about twenty seconds, more preferably from about two seconds to fifteen seconds, more preferably from about two seconds to about twelve seconds, more preferably four seconds to twelve seconds and most preferably from about six seconds to about twelve seconds.

In a preferred form of the invention, the container will have a sidewall having varying thicknesses along an axial dimension of the container with thinner wall portions and thicker wall portions. While in the mold, cooling fluid will be directed to an inner surface of the sidewall which can be a liquid or a gas but more preferably is a gas. Suitable gasses include air, nitrogen and other suitable gasses known to those of skill in the art. In a most preferred form of the invention, the cooling fluid will be recirculating air directed to the inner surface of the container using a blow rod 40 having air holes 42. The recirculating air will be at temperature less than about 50° C. and more preferably within the range of 20° C. to about 50° C. and under a pressure from 20 bar to about 40 bar for a time from about two seconds to about six seconds. In a preferred form of the invention, the holes 42 will have varying area dimensions to provide greater amounts of cooling air to the thicker wall portions and less cooling air to the thinner wall portions. Such a blow rod 40 will be referred to as a tuned blow rod.

Figure 4:
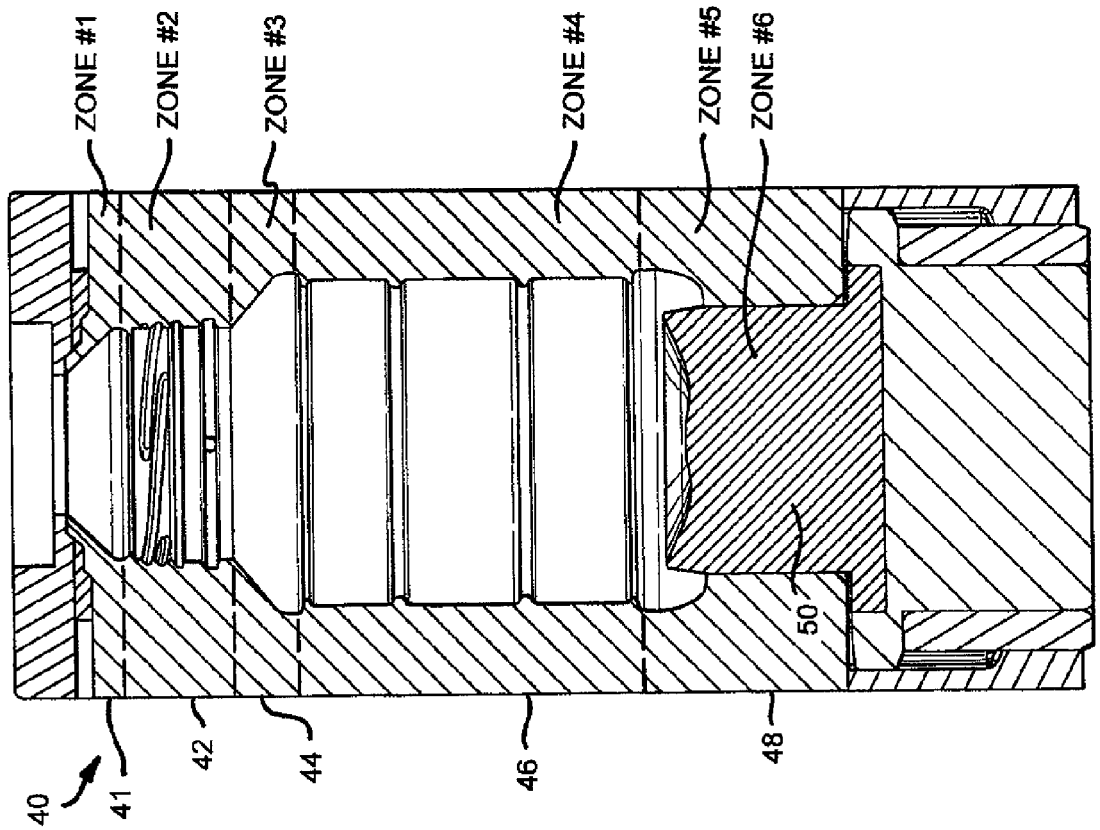
FIG. 4 is a side elevation view of a mold cavity having more than two zones of temperature control.
Figure 3:
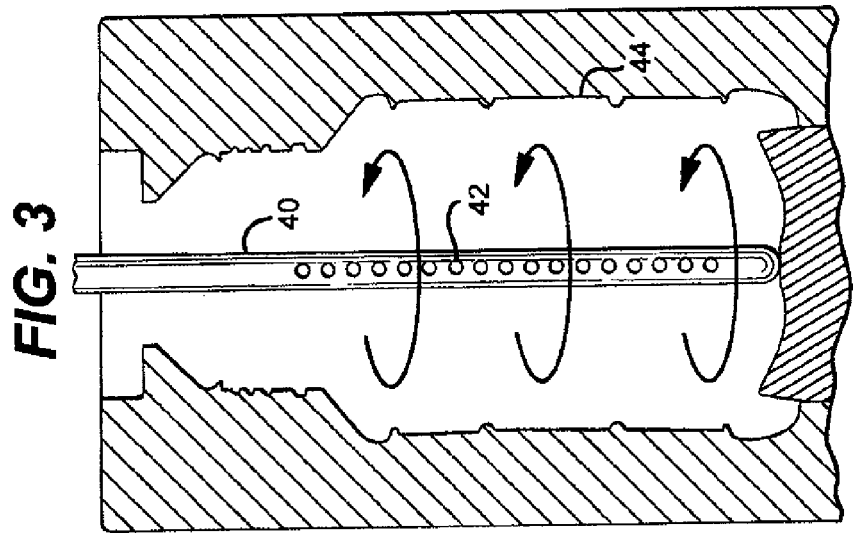
FIG. 3 is a side elevation view in cross section of a blow mold station having a blow rod providing recirculating air to an inner surface of the container being formed.

In one preferred form of the invention, the blow mold will have more than two zones of thermal control along an axial dimension of the mold where the temperature of each zone can be independently controlled within the ranges set forth above. In a preferred form of the invention the thinner wall sections will maintained at a higher temperature, from 155° C. to about 250° C., than the lower temperature, from about 73° C. to about 154° C., of the thicker wall sections. While the mold cavity of FIG. 4 shows six zones of temperature control, the present invention contemplates providing fewer or greater number of zones including from three to eight separate zones of temperature control. FIG. 4 shows one example of a multi-zone blow mold cavity having six zones that will maintain temperatures in the thinner wall sections at higher temperatures than in the thicker wall sections. For example zone 1 for forming the conical top 61 will be maintained within the range of 73° C. to about 120° C., zone 2 corresponding to the finish 62 will be maintained within the range of 160° C.-240° C., zones 3 and 5 corresponding respectively to the shoulder 64 and the heal 48 will be maintained within the range of to about 150° C. to about 230° C., zone 4 corresponding to the barrel section 46 will be maintained within the range of about 190° C. to about 250° C. and zone 6 corresponding to the bottom 50 will be operated within the range of about 100° C. to about 230° C.

Thus the present invention provides a process for forming a heat set PET container with enhanced thermal stability including: (1) inserting a preform into a blow mold; (2) blowing the preform into a container having an inner surface and an outer surface and a sidewall having variations in wall thickness along an axial dimension with thinner wall portions and thicker wall portions and maintaining the blown bottle in the mold at a temperature from about 73° C.-250° C., more preferably from about 150° C. to about 240° C., even more preferably from about 160° C. to about 230° C. and most preferably from 160° C.-200° C., or any range or combination of ranges therein, for a period from two to twenty seconds; (3) selectively cooling predetermined portions of the inner surface by directing a flow of cooling fluid with the thicker wall portions receiving more cooling fluid than the thinner wall portions; and removing the container from the blow mold when the container has sufficiently cooled to be self-supporting and further cooling the container outside the mold. A preferred method further includes forming a container having various sidewall thicknesses along the axial dimension of the container with thinner wall sections and thicker wall sections and maintaining in the blow mold the outer surface of the thinner wall portions at higher temperature than the thicker wall portions.

A preferred container of the present invention will have the following physical properties. The container can be filled with a liquid from 100° C. to about 132° C. without experiencing a change in volume of greater than 3%, more preferably less than 2% and most preferably less than 1.5%. The container will be optically clear.

Container samples were made in accordance with the present invention. Samples 3A and 3B were 24 ounce jar-type containers and Sample 3-C was a 45 ounce jar-type container prepared from PARASTAR 9000 PET resin sold by Eastman Chemical Company using a CIB-LAB laboratory machine with an integrated platform. The barrel section of these samples constituted about 80% of the surface area of the containers. The samples were blown from a preform at a starting temperature of about 103° C. to about 115° C. and having a single heat history. The mold was operated respectively for Samples 3A, 3B, 3C at temperatures of 180° C., 190° C. and 200° C., measured at the barrel section, for periods respectively of six seconds, eight seconds and twelve seconds. Prior art container PET samples 1A and 1B were 24 ounce jar-type container in an unfilled, clean state and were representative of containers well known to those of skill in the art.

Figure 5:
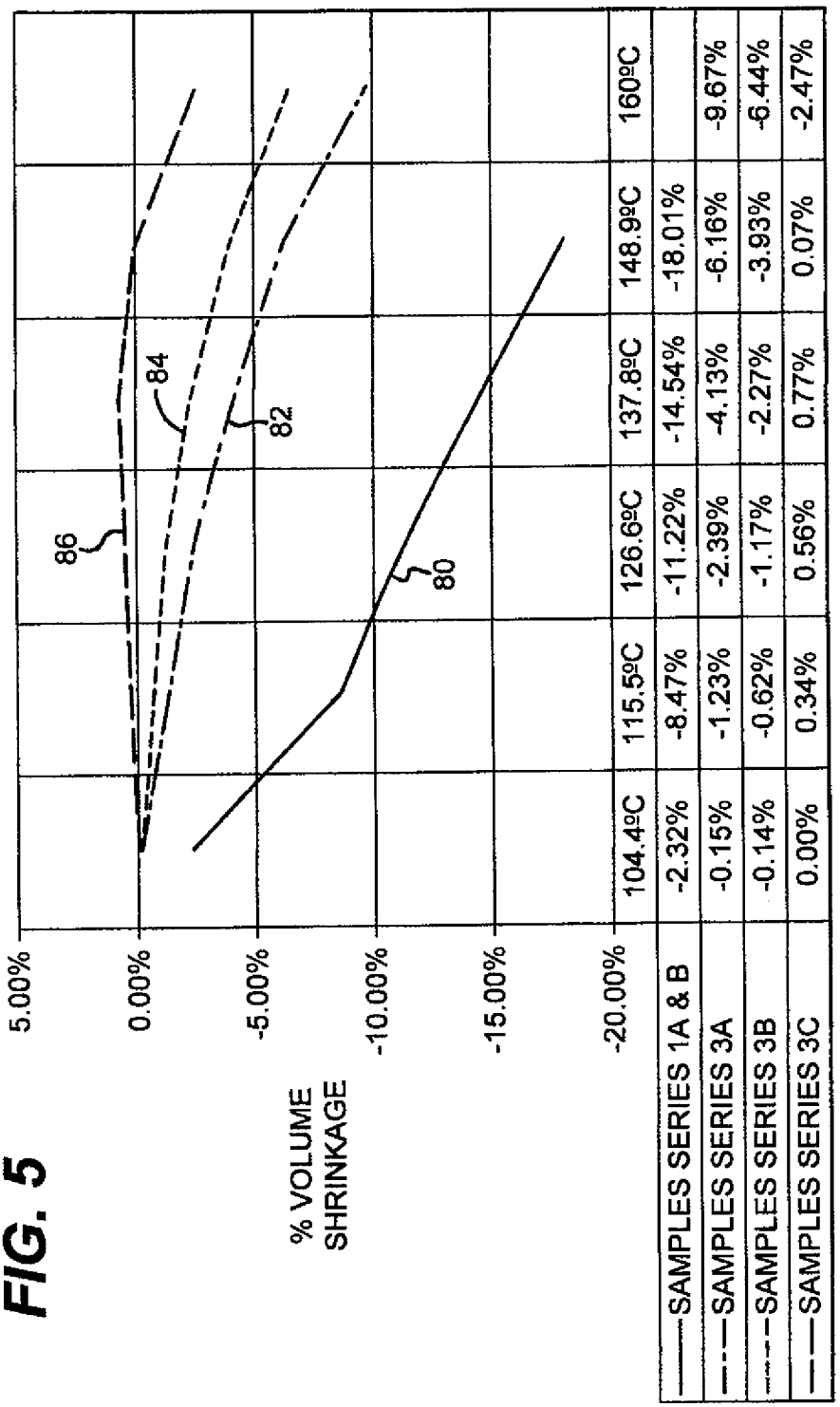
FIG. 5 is a graph of volumetric change versus hot fill temperature for containers having varying crystallinities.

FIG. 5 shows a plot of volume change (percent) versus hot fill temperatures for Sample containers 3A-3C of the present invention and those of the prior art. The containers were first measured for volume by filling to overflow. The containers were then filled with hot vegetable oil, allowed to sit for five minutes, emptied and measured for volume, and the volume measurement process repeated for six discrete temperatures. The temperatures of the oil in the hot fill process were 104.4° C., 115.5° C., 126.6° C., 137.8° C., 148.9° C. and 160° C. The containers were filled allowing for 12.5 mm headspace. The results of the hot fill tests are shown in FIG. 5 with prior art container samples 1A and 1B referred to by reference numeral 80 and container samples of the present invention 3A-3C respectively referred to with numerals 82, 84, 86.

Figure 6:
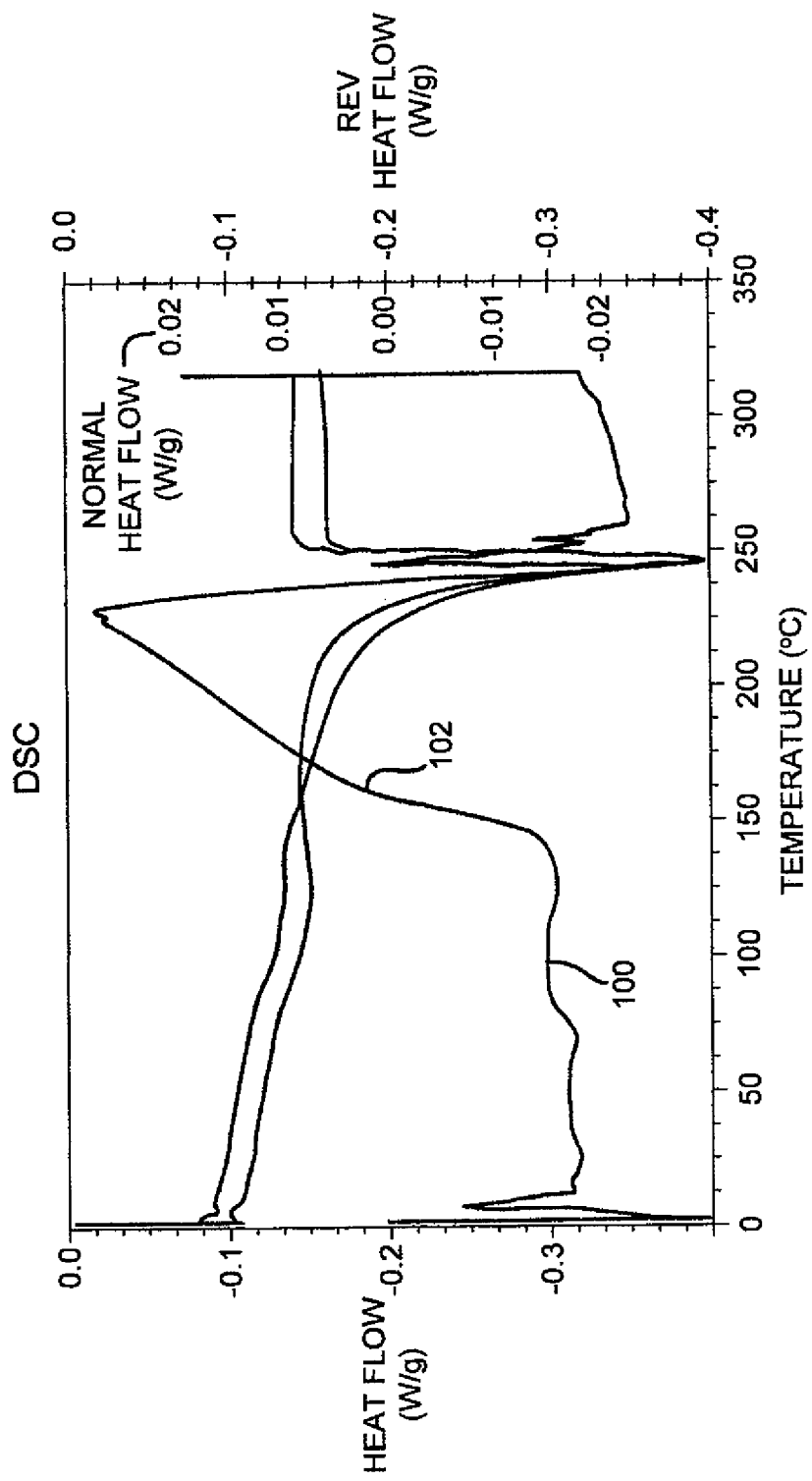
FIGS. 6-10 respectively show a plot of the results of a temperature modulated differential scanning calorimetry data PET containers Sample 3-A, Sample 3-B, Sample 3-C, Sample 1-A and Sample 1-B)
Figure 7:
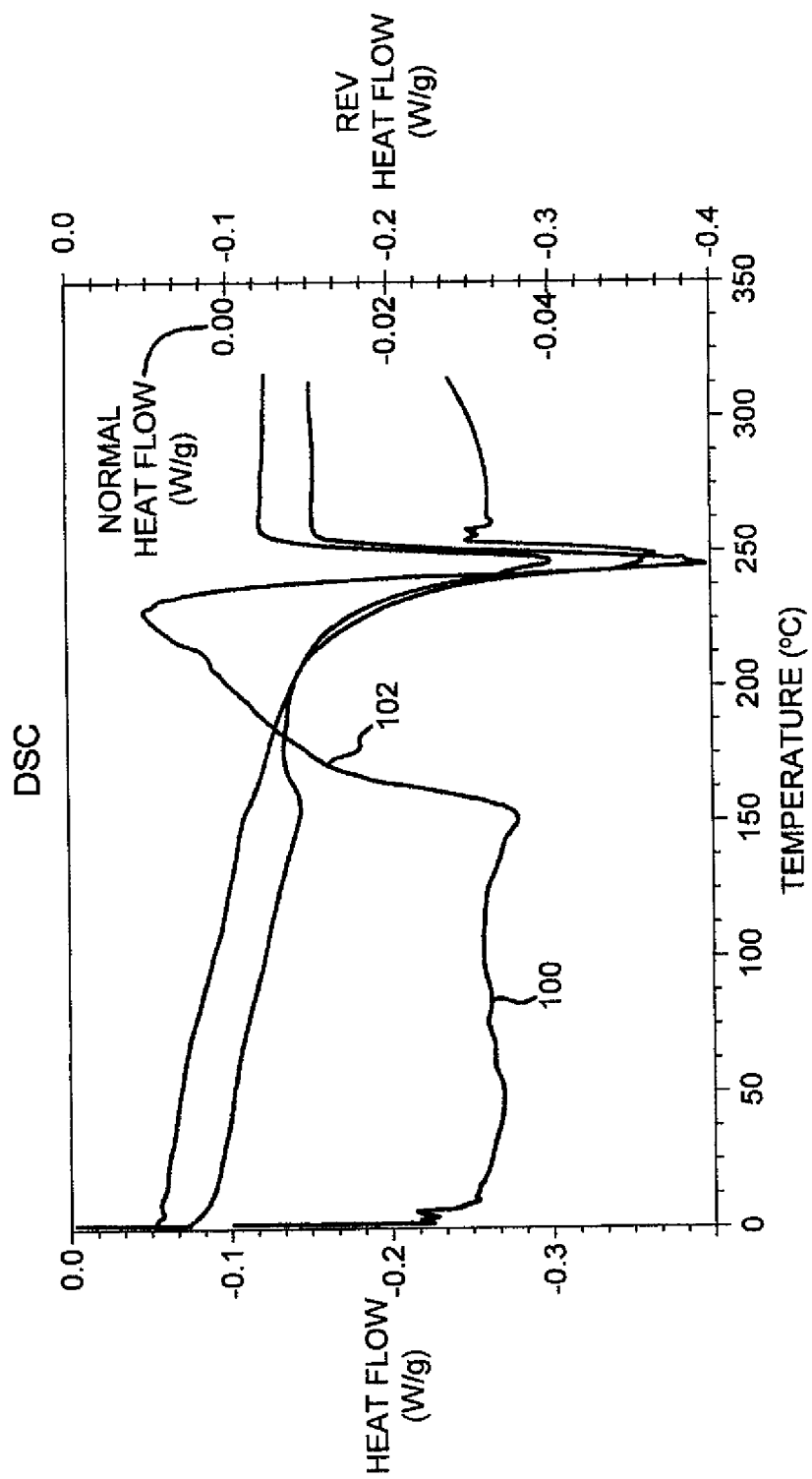
Figure 8:
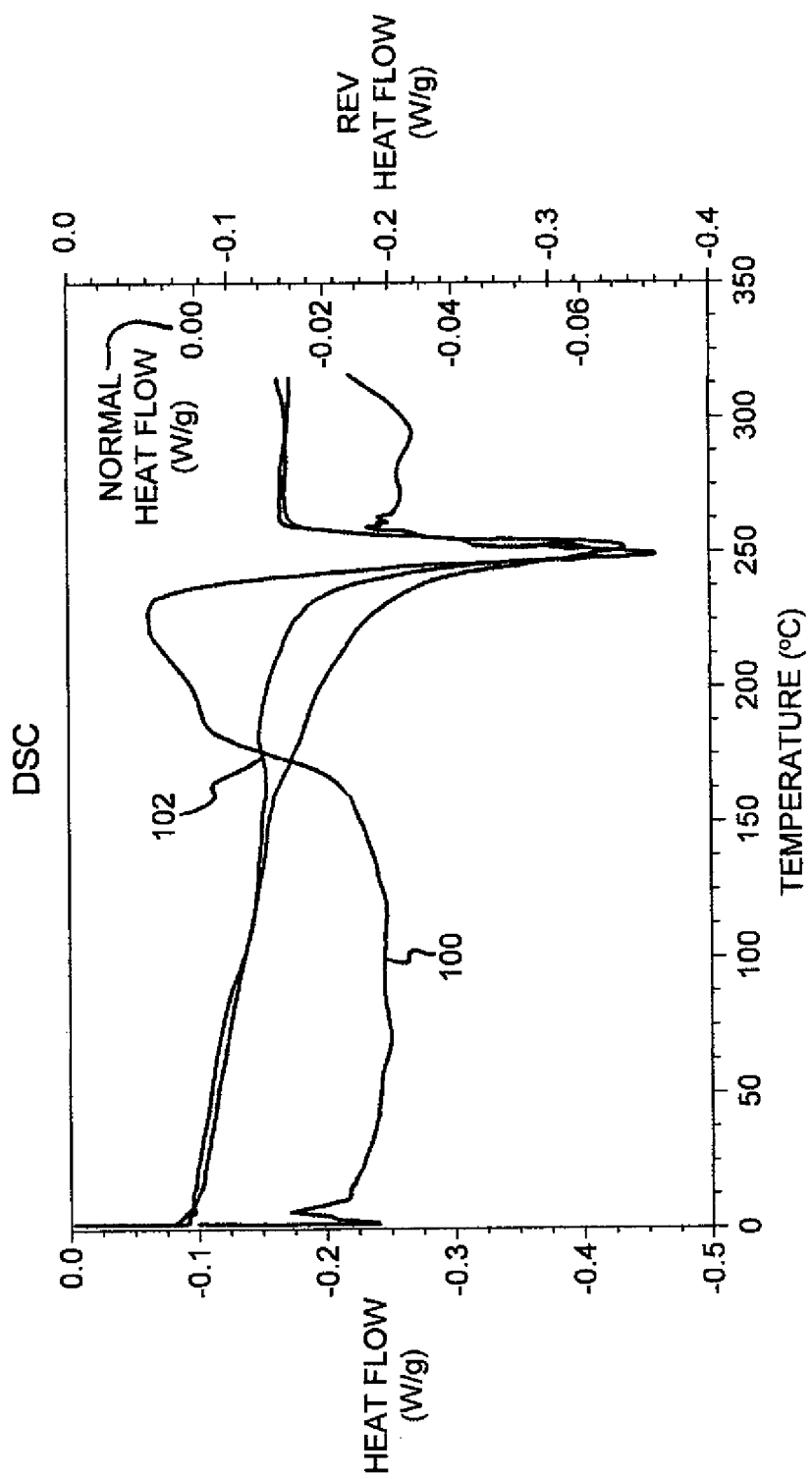
Figure 9:
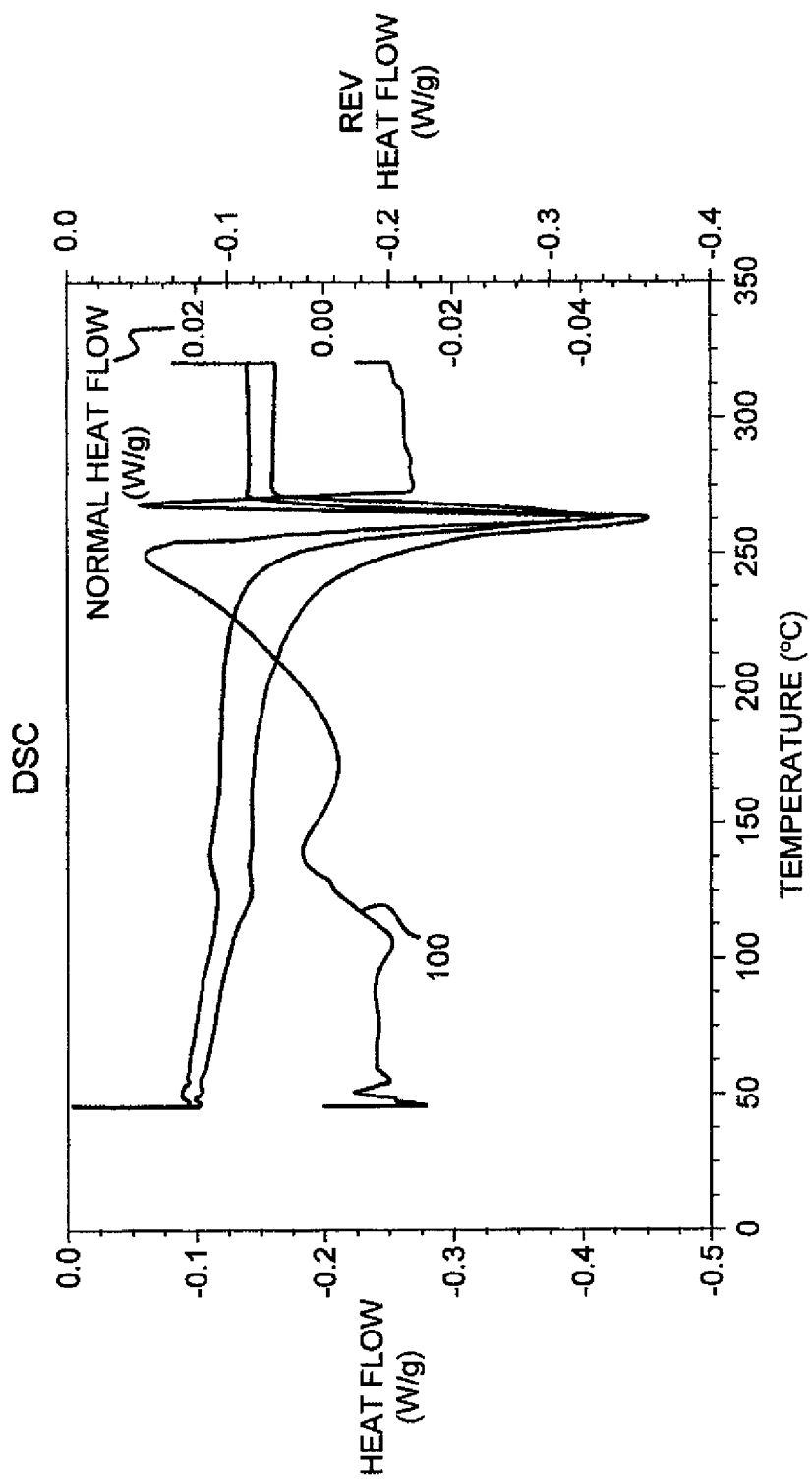
Figure 10:
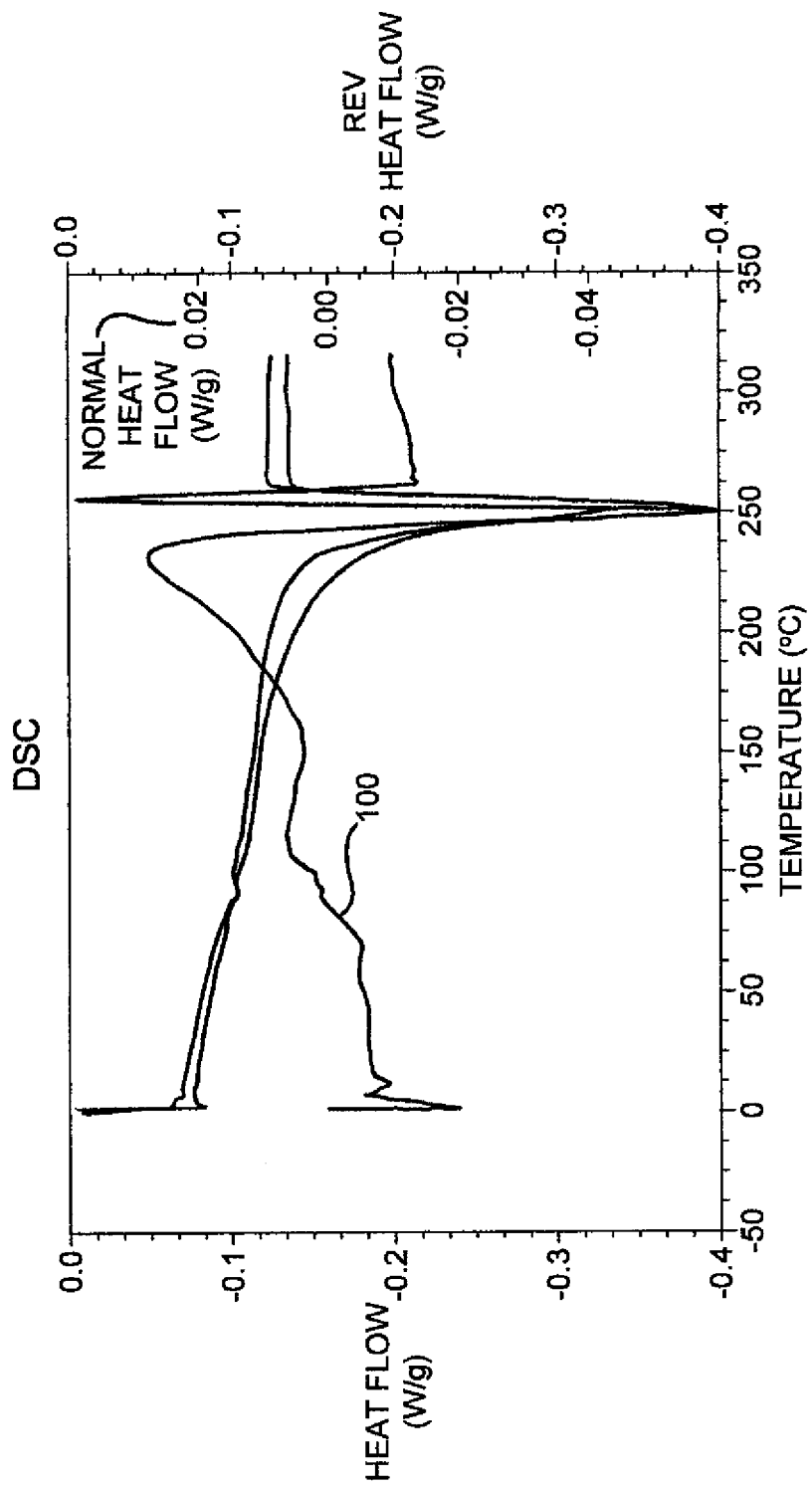

Samples of PET containers of the present invention (Samples 3-A, 3-B, 3-C) and of samples of prior art PET containers 1-A, 1-B) were subjected to temperature modulated differential scanning calorimetry (MDSC) and analyzed in the temperature range of 0° C. to 325° C. at a heating rate of 5° C./min. The samples were maintained in an inert nitrogen atmosphere with a flow rate of 50 ml/min. The results of the MDSC data are shown in the following figures (FIG. 6, Sample 3-A, FIG. 7, Sample 3-B, FIG. 8, Sample 3-C, FIG. 9, Sample 1-A and FIG. 10, Sample 1-B). The information is summarized below in Tables 1 and 2.

The data in Table 1 show that the PET containers of the present invention have a first endothermic glass transition temperature 100 (FIGS. 6-8) and a second endothermic transition temperature 102 substantially higher than the first endothermic glass transition temperature. In a preferred form of the invention, the second endothermic transition will be at least about 20° C. higher than the first endothermic glass transition temperature, more preferably at least about 30° C. higher, even more preferably at least about 40° C. higher and most preferably at least about 50° C. higher. In another preferred form of the invention the second endothermic transition will be at a temperature from about 120° C. to about 180° C., even more preferably from about 130° C. to about 170° C. and most preferably from about 135° C. to about 165° C.

Figure 17:
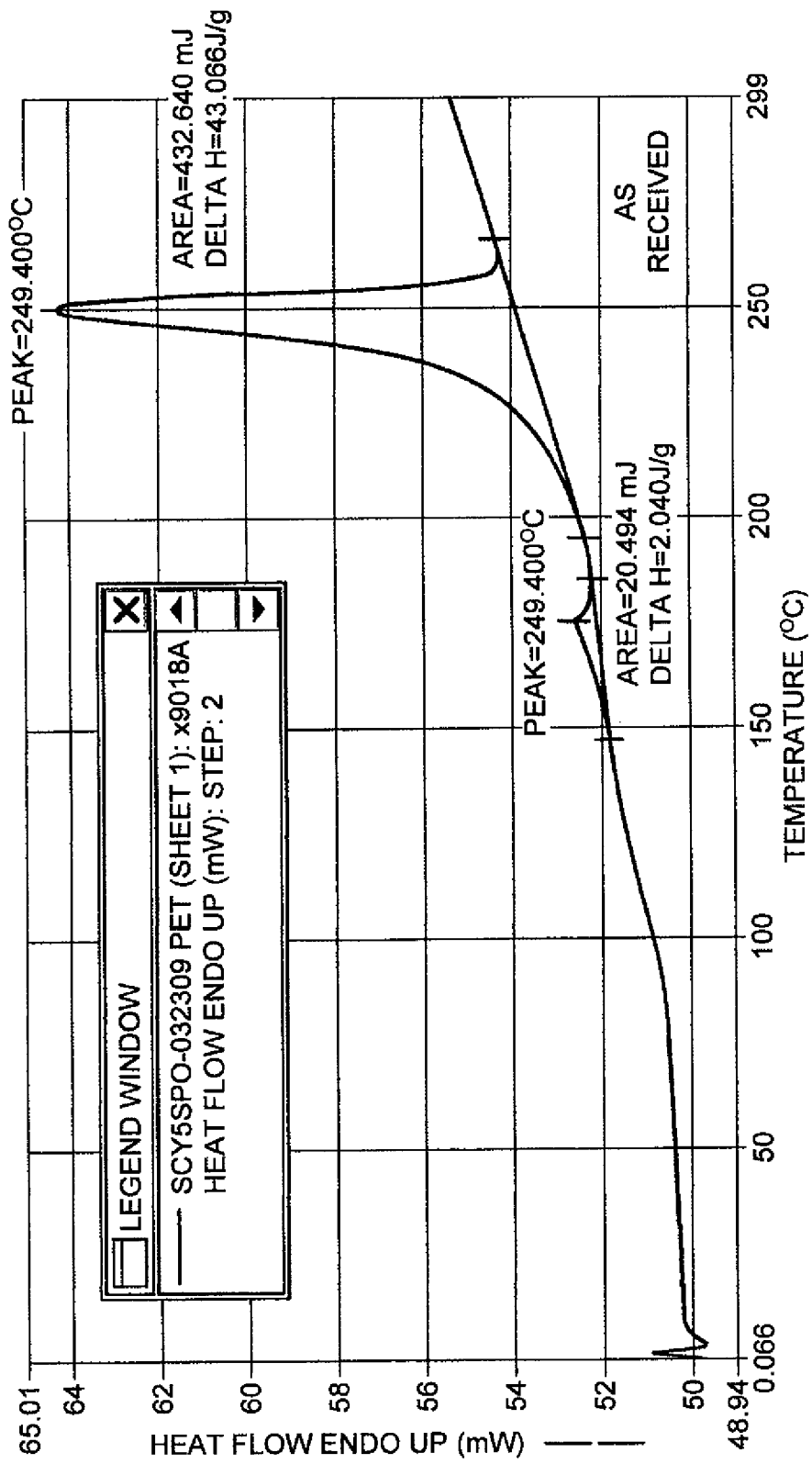
FIG. 17 is plot of modulated DSC for a container sample of the present invention.

The data also show the change in heat capacity of the glass transition temperature for container samples taken from the barrel section of the container (which constitutes 80% of the surface area of the container) of the present invention is less than about 0.10 J/g° C. (FIG. 17). It is also possible there is a no endotherm at temperatures from 70° C. to about 100° C. In another preferred form of the invention, the DSC plot will have no cold crystallization exotherm from 115° C. to 150° C.

The data also show the enthalpy of the second endothermic transition for container samples of the present invention is greater than about 0.50 J/g, more preferably greater than about 1.00 J/g, even more preferably greater than about 1.50 J/g and most preferably greater than about 2.00 J/g.

None of the prior art PET container samples tested showed a second endothermic transition in their MDSC plots.

TABLE 1

Glass Transition Temperatures of the PET bottle samples.

| SAMPLE DESCRIPTION | SPECIMEN # | GLASS TRANSITION TEMPERATURE, ° C. | |
|---|---|---|---|
| | | 1st | 2nd |
| Sample #1-A | 1 | 83.8 | |
| (24 oz) | 2 | 93.3 | |
| | Average | 88.6 | |
| Sample #1-B | 1 | 86.0 | |
| (24 oz) | 2 | 95.5 | |
| | Average | 90.8 | |
| Sample #3-A | 1 | 91.6 | 149.0 |
| (24 oz) | 2 | 101.5 | 133.9 |
| | Average | 96.6 | 141.5 |
| Sample #3-B | 1 | 89.0 | 160.9 |
| (24 oz) | 2 | 90.1 | 163.7 |
| | Average | 89.6 | 162.3 |
| Sample #3-C | 1 | 90.6 | 171.3 |
| (45 oz) | 2 | 104.6 | 165.9 |
| | Average | 97.6 | 168.6 |

TABLE 2

Melting and Crystallization Data of the PET bottle Samples

| Sample Description | Specimen # | Tm Onset (°C.) | Tm Offset (°C.) | Tm Peak (°C.) | Hm 140° C. to 275° C. (J/g) | Hc 140° C. to 275° C. (J/g) | Hm − Hc (J/g) | % Crystallinity |
|---|---|---|---|---|---|---|---|---|
| Sample #1-A (24 oz) | 1 | 237.7 | 258.7 | 249.3 | 58.0 | 19.7 | 38.3 | 27.4 |
|  | 2 | 238.5 | 255.9 | 249.9 | 82.2 | 36.8 | 45.4 | 32.4 |
|  | Average | 238.1 | 257.3 | 249.6 | 70.1 | 28.3 | 41.9 | 29.9 |
| Sample #1-B (24 oz) | 1 | 235.7 | 259.3 | 253.1 | 61.0 | 18.0 | 43 | 30.7 |
|  | 2 | 234.6 | 258.3 | 252.1 | 62.3 | 20.3 | 42 | 30 |
|  | Average | 235.2 | 258.8 | 252.6 | 61.7 | 19.2 | 42.5 | 30.4 |
| Sample #3-A (24 oz) "Heat" | 1 | 232.5 | 253.3 | 246.9 | 67.6 | 34.4 | 33.2 | 23.7 |
|  | 2 | 231.4 | 255.2 | 245.3 | 74.1 | 38.0 | 36.1 | 25.8 |
|  | Average | 232.0 | 255.3 | 246.1 | 70.9 | 36.2 | 34.7 | 24.8 |
| Sample #3-B (24 oz) "Heat" | 1 | 228.4 | 253.4 | 246.7 | 84.3 | 42.6 | 41.7 | 29.8 |
|  | 2 | 224.1 | 253.5 | 246 | 62.0 | 26.5 | 35.5 | 25.4 |
|  | Average | 226.3 | 253.5 | 246.4 | 73.2 | 34.55 | 38.6 | 27.6 |
| Sample #3-C (45 oz) | 1 | 233.3 | 258.1 | 251.6 | 65.7 | 237.7 | 42 | 30.0 |
|  | 2 | 234.7 | 258.1 | 250.6 | 87.7 | 37.1 | 50.6 | 36.0 |
|  | Average | 234.0 | 258.1 | 251.1 | 76.7 | 30.4 | 46.3 | 33 |

Samples of the prior art PET containers and containers of the present invention were subjected to X-ray diffraction analysis. Small sections were cut from each sample and flattened by hand. Each sample was then loaded onto a zero background holder and placed into a Panalytical X'Pert MPD Pro diffractometer using Cu radiation at 54 KV/40 mA. Scans were run over the range of 10°-70° with a step size of 0.0158° and a counting time of 250 seconds per step. FIGS. 11-15 respectively show the diffraction patterns for Samples 1-A, 1-B, 3-A, 3-B and 3-C. Peaks 1, 3, 4 and 5 are attributable to the crystalline phase and Peak 2 is attributable to the amorphous phase. Crystalline peaks have halfwidths in the range of 0.1° to 3° and amorphous peaks have halfwidths close to 10.

Figure 16:
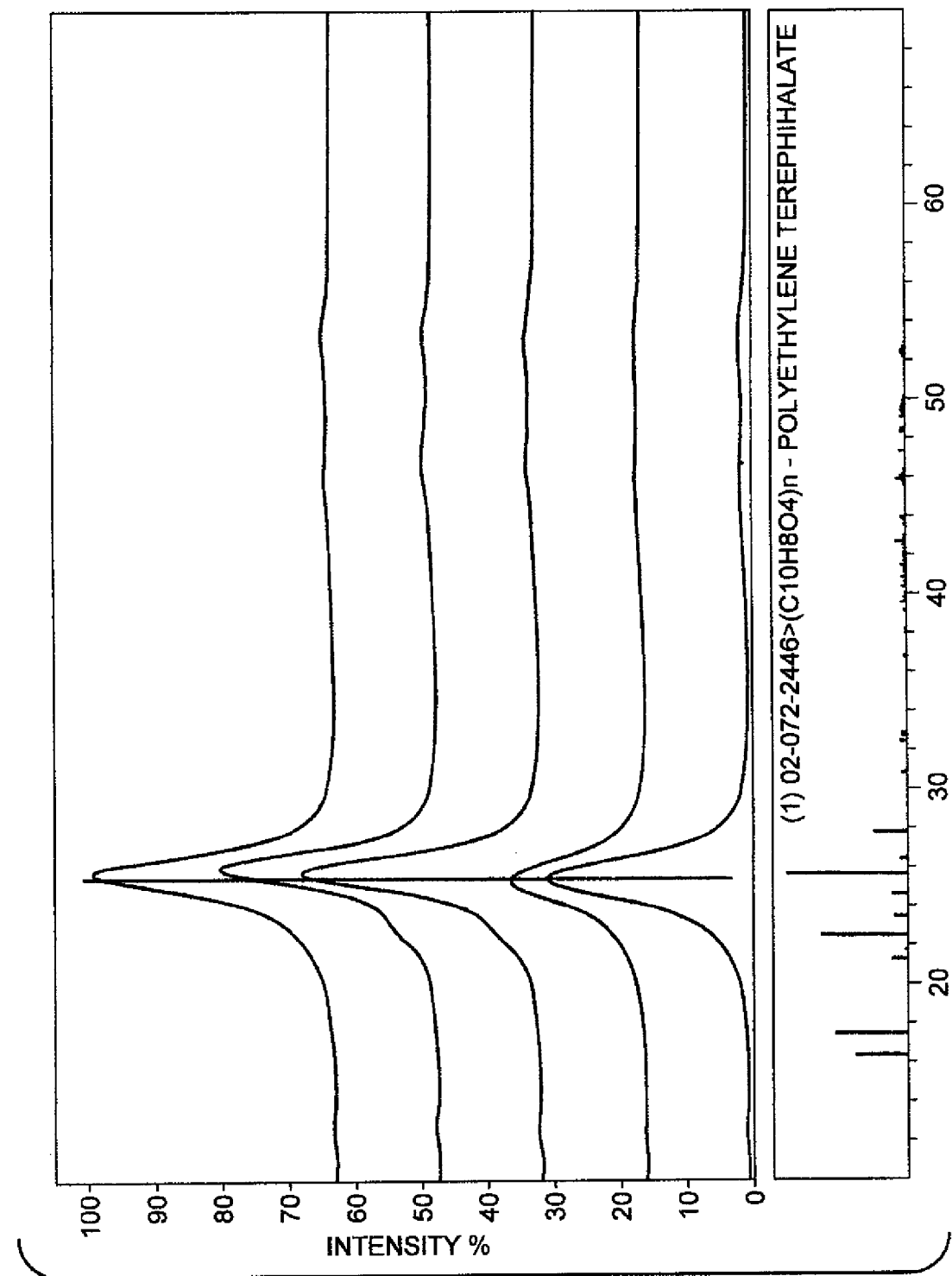
FIG. 16 shows a portion of X-ray diffraction patterns for the tested samples and vertically spaced from one another for clarity purposes.

The crystalline and amorphous peaks shown in FIGS. 11-15 were separated and recorded for each sample in Table 3. Notably, the data show a greater number of crystalline peaks in the container samples of the present invention when compared to those of the prior art container samples. Further, there is a shift in the peak position as shown in FIG. 16 and in Tables 4A and 4B below.

TABLE 3

% Crystallinity in the PET bottle samples.

|  | Number of Crystalline Peaks | PET Crystalline | PET Amorphous |
|---|---|---|---|
| #1-A | 4 | 30.9% | 69.1% |
| #1-B | 4 | 31.4% | 68.6% |
| #3-A | 6 | 21.3% | 78.7% |
| #3-B | 6 | 23.6% | 76.4% |
| #3-C | 6 | 19.7% | 80.3% |

TABLE 4A

XRD Peak Positions Prior Art Samples

|  | Peak Positions (°) | | | |
|---|---|---|---|---|
|  | #1 | #3 | #4 | #5 |
| #1-A | 13.03° | 25.54° | 46.19° | 53.03° |
| #1-B | 12.84° | 25.43° | 46.13° | 53.17° |

TABLE 4B

XRD Peak Positions (°) of Container Samples of the present invention

| Sample | #1 | #2 | #3 | #5 | #6 | #7 | #8 |
|---|---|---|---|---|---|---|---|
| #3-A | 12.90° | 17.44° | 22.5° | 25.76° | 42.25° | 46.63° | 53.26° |
| #3-B | 12.99° | 17.44° | 22.5° | 25.94° | 42.25° | 46.70° | 53.38° |
| #3-C | 12.90° | 17.44° | 22.5° | 25.64° | 42.25° | 46.49° | 53.23° |

Figure 11:
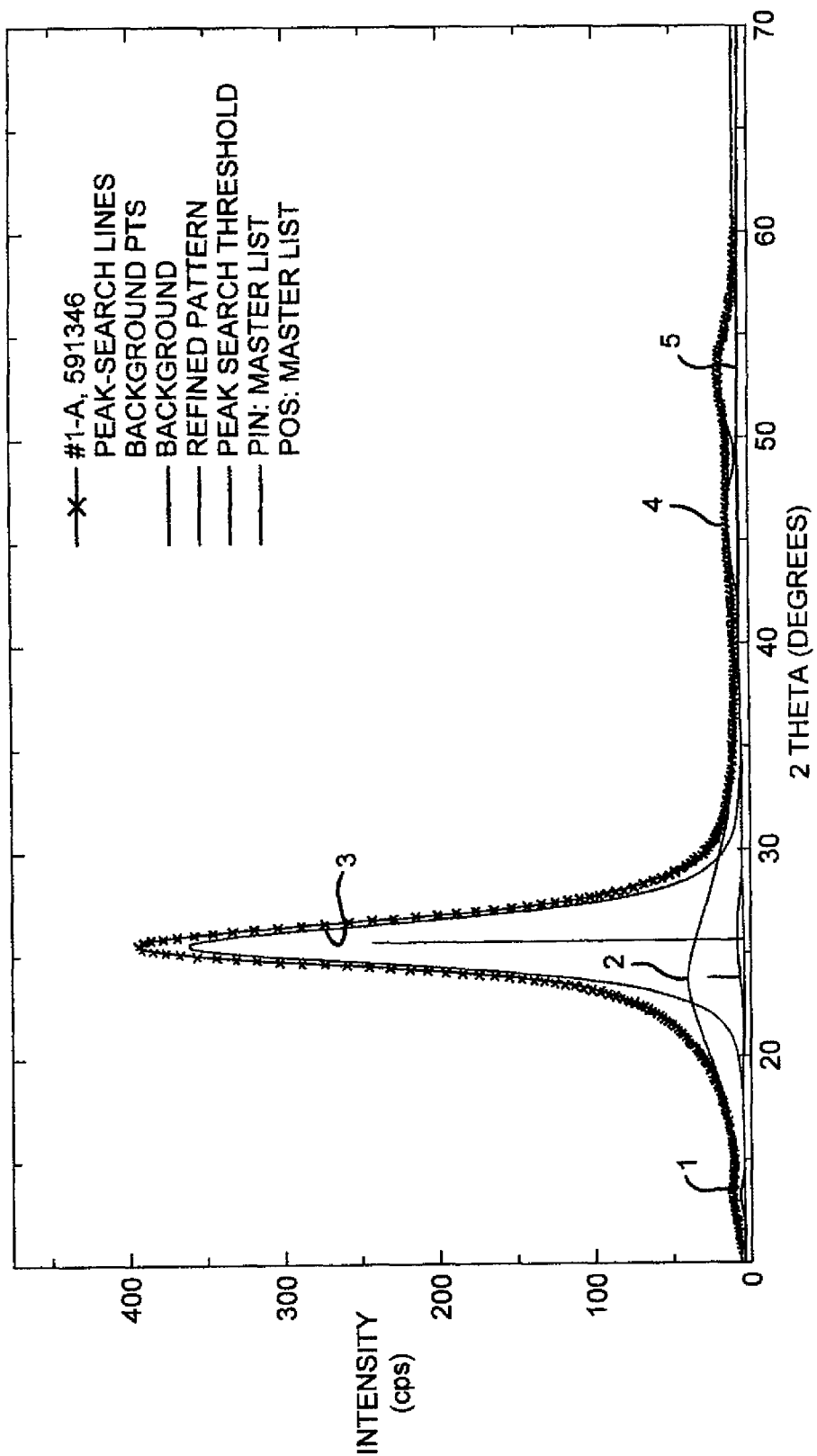
FIGS. 11-15 respectively show the X-ray diffraction patterns for Samples 1-A, 1-B, 3-A, 3-B and 3-C.
Figure 12:
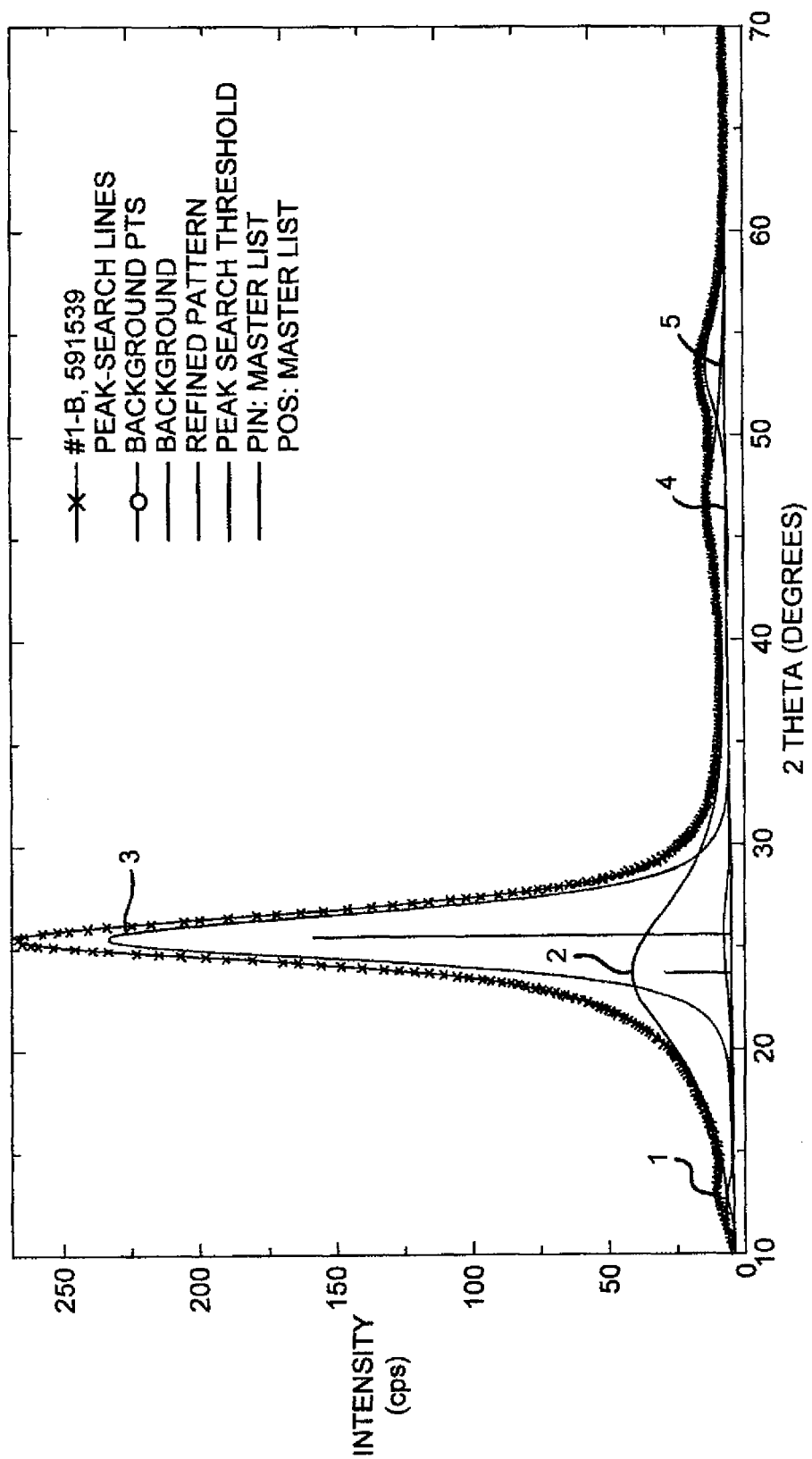
Figure 13:
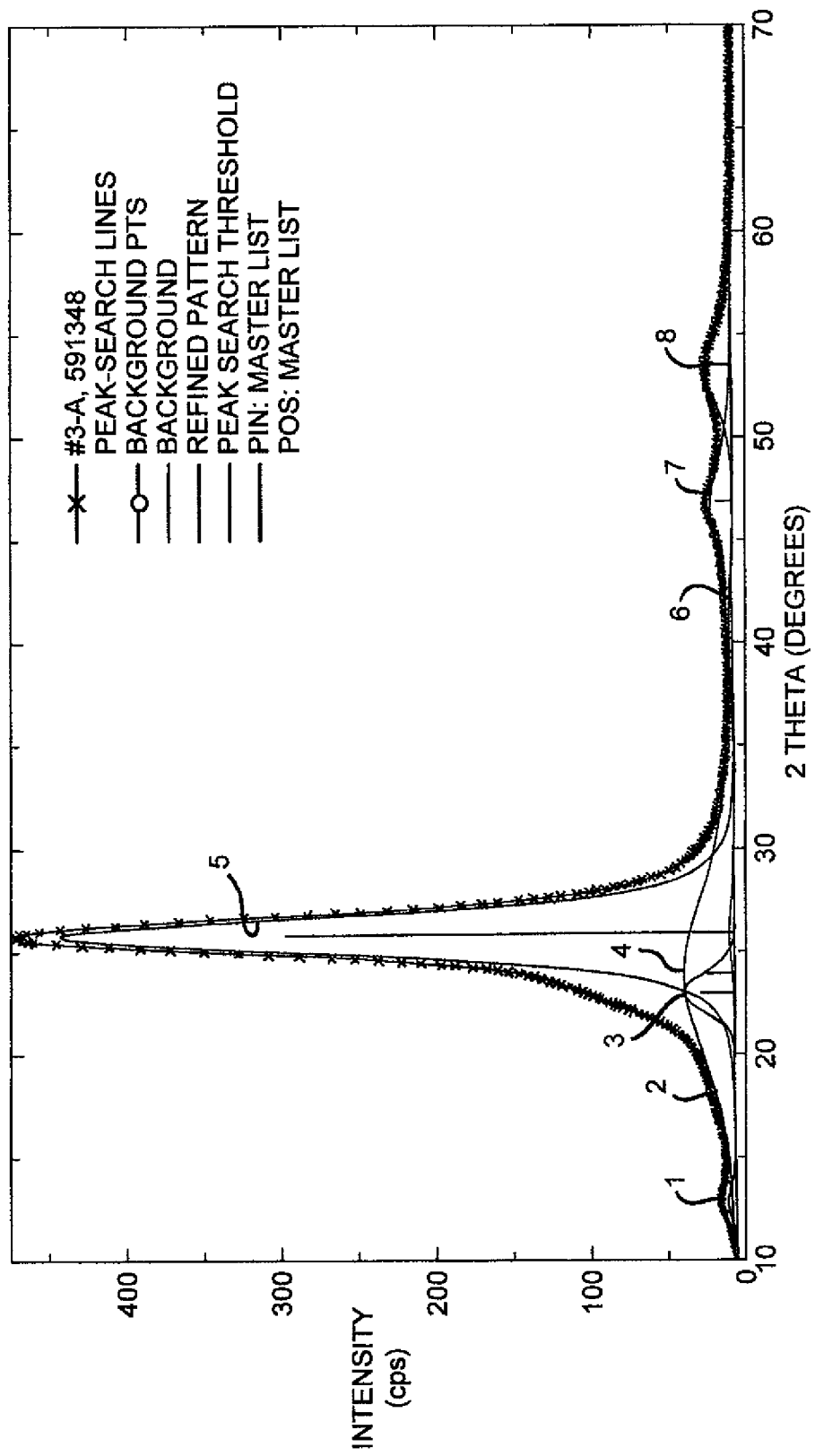
Figure 14:
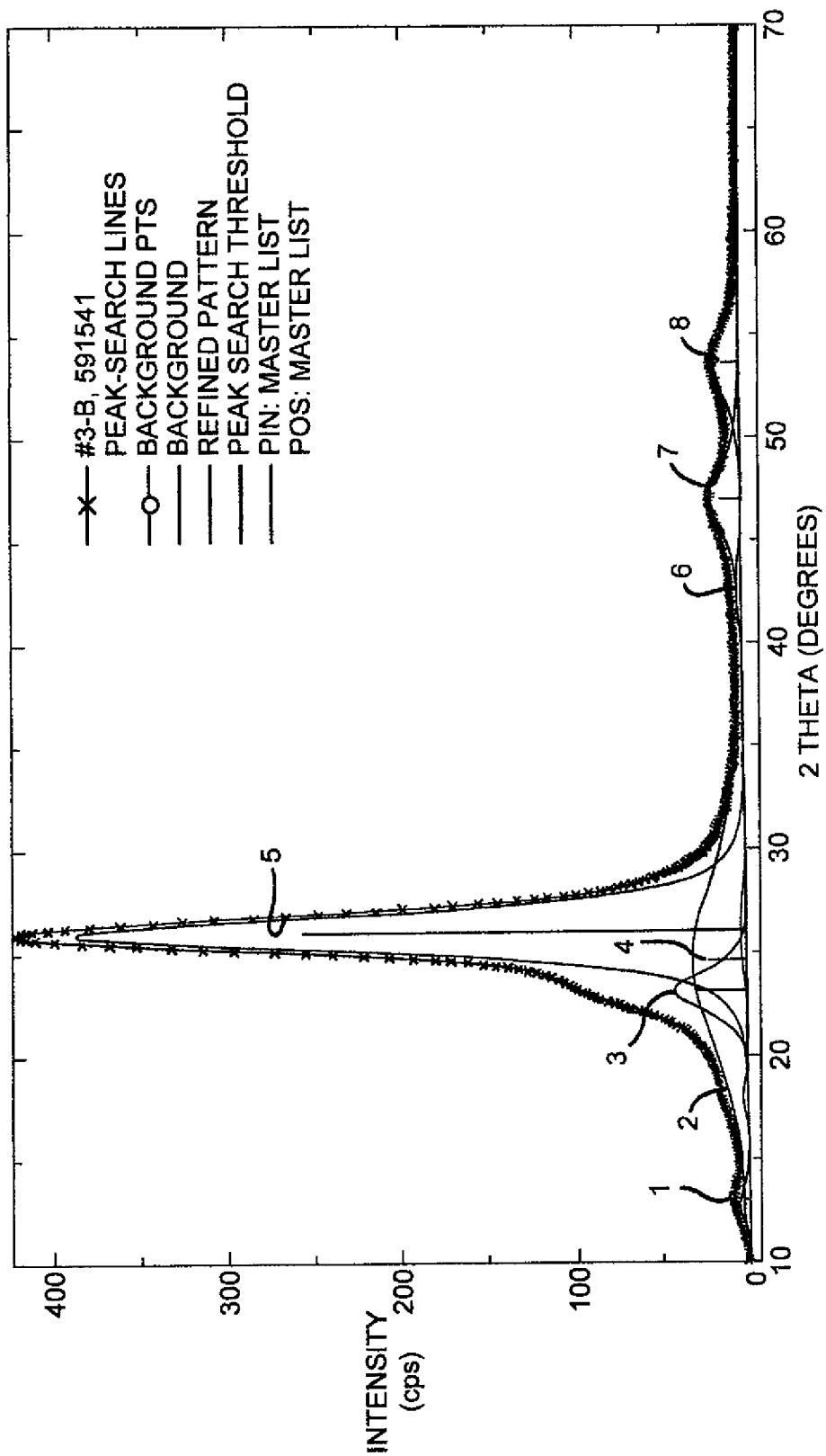
Figure 15:
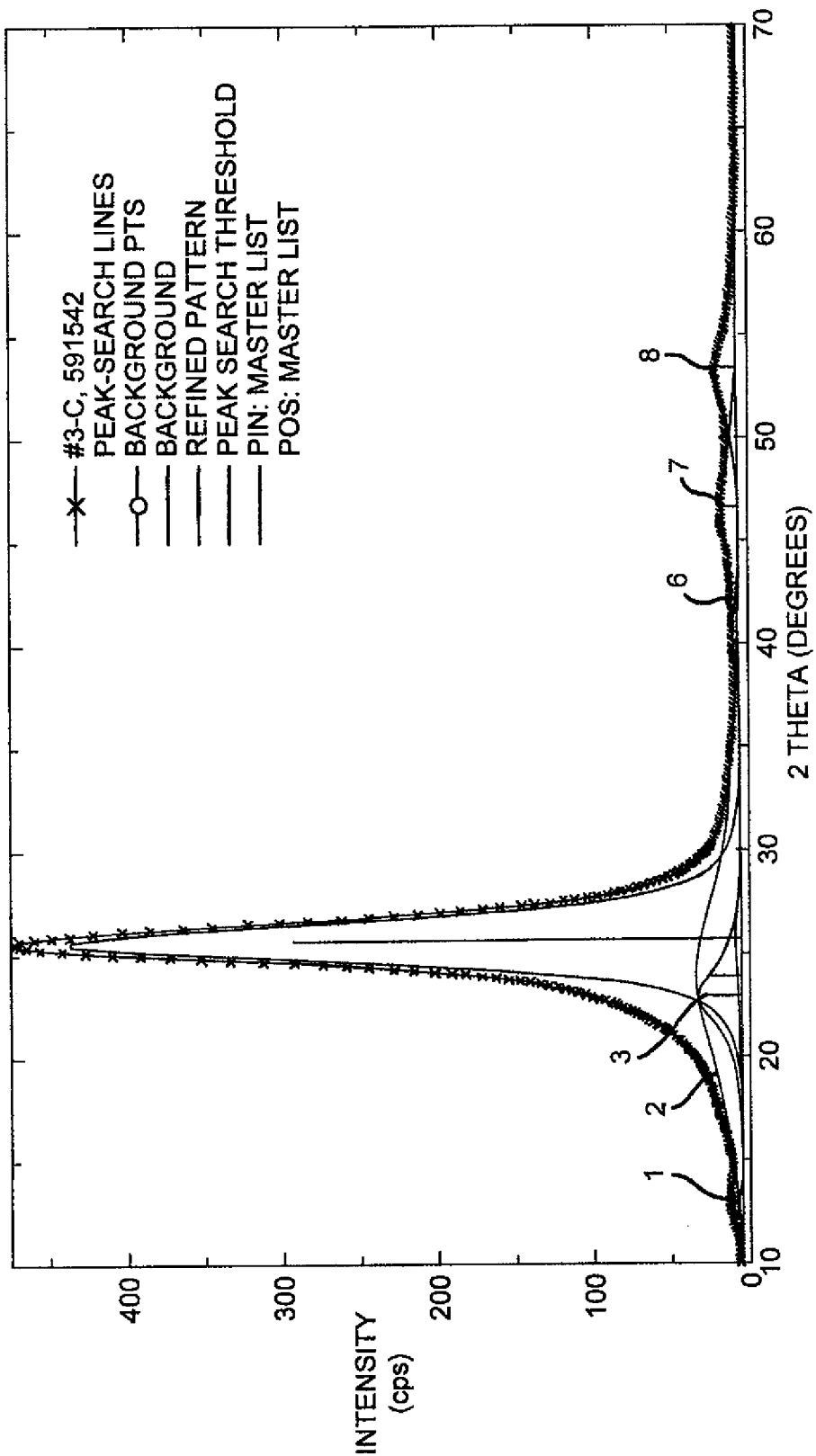

In a preferred form of the invention, the XRD peaks of the present invention will show at least five crystalline peaks and even more preferably at least six crystalline peaks (FIGS. 11-13). Crystalline peaks 110 can be distinguished from amorphous peaks 112 by the relative shape of the peaks with the crystalline peaks being tall and narrow and the amorphous peaks being rounded and short. Typically a crystalline peak will have a FWHM of from about 1.5° to about 3° and an amorphous peak will have a FWHM of about 9° to about 10°. The term FWHM refers to the breadth of a diffraction peak at half the maximum intensity in radians. Two crystalline peaks or inflection points observed in XRD plots of container samples of the present invention but not found in the prior art container samples were found at nominal values of 17.44° and 42.25°.

Further, as shown in FIG. 16, the XRD peak positions of the present invention are shifted from those shown in the prior art samples. While the shifts between the prior art Samples series 1 and those of the present invention Series 3 may not seem large, they are well beyond the typical experimental errors. Of particular note is the fact that some peaks are fixed while others shift by 0.5° or more. The most common experimental error would have caused all of the peaks to shift by the same amount. Since this is not the case here, experimental error can be ruled out as the cause of the shift. The XRD data indicate a difference in the crystalline phase between the prior art container samples and those of the present invention.

As shown in Tables 3 and 5, the containers of the present invention will have a combination of low crystallinity and high density. In a preferred form of the invention the crystallinity of the container will be from about 30%, more preferably less than about 28%, even more preferably less than about 25%. In another preferred form of the invention the crystallinity will be from about 30% to about 15%, more preferably from 28% to about 18% and most preferably from about 25% to about 18%. In a preferred form of the present invention, the density will be greater than about 1.370 g/cc and more preferably greater than about 1.375 g/cc. The density of the prior art container samples and those of the present invention were measured and the results are set forth in Table 5 below.

TABLE 5

Density analysis results of PET bottle samples

| Sample Description | Specimen # | Density (g/cc) |
|---|---|---|
| Sample #1-A (24 oz) | 1 | 1.36 |
|  | 2 | 1.37 |
|  | Average | 1.37 |
| Sample #1-B (24 oz) | 1 | 1.36 |
|  | 2 | 1.37 |
|  | Average | 1.37 |
| Sample #3-A (24 oz) "Heat" | 1 | 1.38 |
|  | 2 | 1.38 |
|  | Average | 1.38 |
| Sample #3-B (24 oz) "Heat" | 1 | 1.38 |
|  | 2 | 1.38 |
|  | Average | 1.38 |
| Sample #3-C (45 oz) | 1 | 1.38 |
|  | 2 | 1.38 |
|  | Average | 1.38 |

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims

What is claimed is:

1. A blow molded PET container comprising a wall having a density greater than about 1.370 g/cc that, when subjected to a DSC analysis, the wall has a first endothermic glass transition temperature and a second endothermic transition temperature that is at least 20° C. higher than the first endothermic glass transition temperature, wherein the blow molded container will not experience a change in volume of more than 3% when filled with a liquid having a temperature of from 100° C. to 132° C.

2. The container of claim 1 wherein the first endothermic glass transition temperature is less than about 100° C.

3. The container of claim 1 wherein a change in heat capacity at the first endothermic glass transition temperature of less than about 0.10 J/g° C. is exhibited.

4. The container of claim 1 wherein the enthalpy of the second endothermic transition temperature is higher than about 2.0 J/g° C.

5. The container of claim 1 wherein the second endothermic transition temperature is higher than 120° C.

6. The container of claim 1 wherein the second endothermic transition temperature is higher than 140° C.

7. The container of claim 1 wherein the second endothermic transition temperature is higher than 160° C.

8. The container of claim 1 wherein the container will experience a change in volume of less than 2%.

9. The container of claim 8 wherein the container will experience a change in volume of less than 1.5%.

10. The container of claim 1 wherein the wall, when subjected to a DSC analysis, will not exhibit a cold crystallization exotherm from 115° C. to 150° C.

* * * * *